United States Patent Office 3,410,882
Patented Nov. 12, 1968

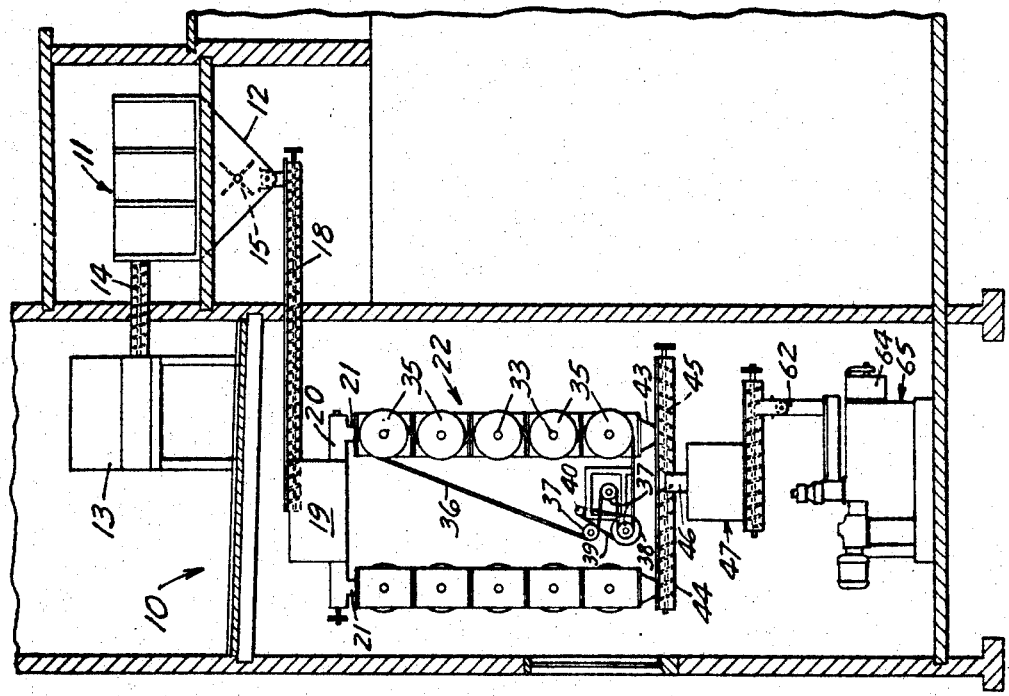

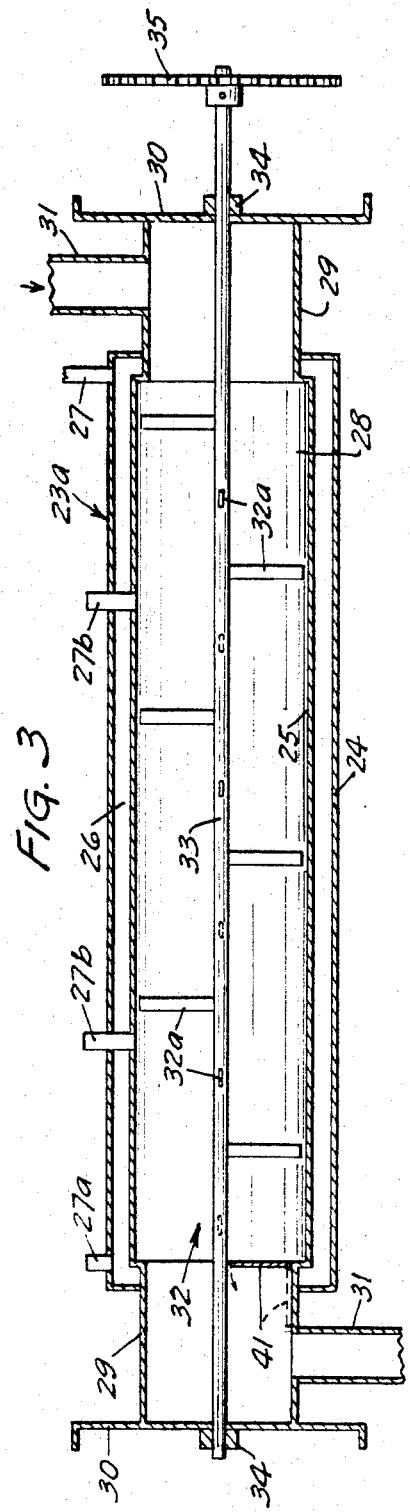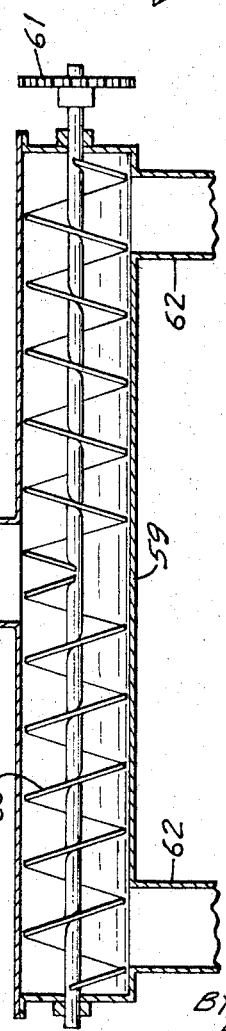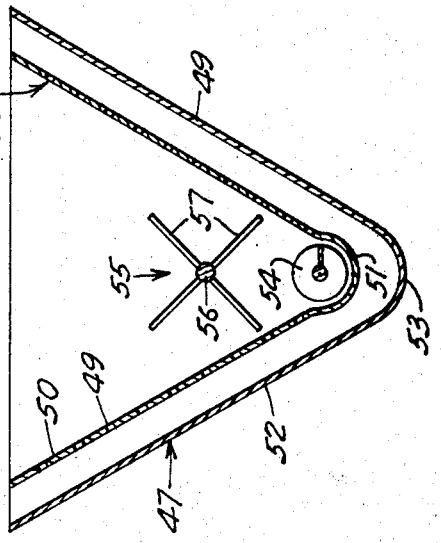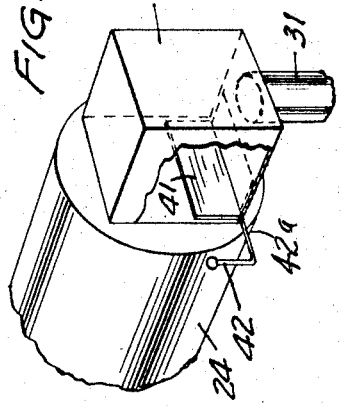
INVENTORS
CHRISTIAN D. MACY
JEAN A. BURTON
ROBERT E. LAUGEN
ATTORNEYS

3,410,882
PROCESS AND APPARATUS FOR CONTINUOUS RENDERING OPERATIONS
Christian D. Macy, Jean A. Burton, and Robert E. Laugen, Austin, Minn., assignors to Geo. A. Hormel & Company, Austin, Minn., a corporation of Delaware
Filed Dec. 9, 1963, Ser. No. 328,865
6 Claims. (Cl. 260—412.6)

ABSTRACT OF THE DISCLOSURE

Process and apparatus for continuously rendering fat from adipose tissue including a plurality of horizontally oriented vertically spaced apart inter-connected chambers through which the animal matter to be rendered flows. The chambers being heated to a temperature within a range of 210° F. to 280° F. and each having agitating means therein to cause the animal matter to be impinged against the inner cylindrical surfaces therein. Gate means within each chamber partially obstructing the interior of each chamber and thereby retaining a predetermined volume of animal matter within each chamber whereby causing liquefaction of the fat and rupturing of the fat tissues and means for separating liquefaction and solid materials.

---

This invention relates to a continuous, high capacity process and apparatus for rendering fat from animal matter.

An object of this invention is to provide a continuous process and apparatus for rendering fat from animal matter, including fish, poultry, hogs, cattle, bone, fatty tissue, viscera components and offal material, in a dry rendering operation, and in which the process and apparatus is designed to give a high yield of finished product with a minimum of labor requirements in the operation of the process and apparatus, and in the handling of the materials being rendered.

Another object of this invention is to provide a novel continuous high capacity process and apparatus for rendering fat from animal matter wherein the processed materials such as bone, fatty tissue, viscera components, offal and the like are first comminuted and thoroughly admixed, and in which a continuous stream of the uniformly mixed comminuted animal matter is passed through a series of unpressurized interconnected heating zones to subject the animal matter to a predetermined temperature for a period of time to sufficiently cause melting and separation of the fat from the animal tissue, and wherein the liquid fat and solid materials are thereafter physically separated and collected.

Another object of this invention is to provide a high capacity continuous process and apparatus for either rendering inedible or edible fat from animal matter, in a dry edible rendering operation, wherein the process and apparatus are capable of utilizing the existing facilities such as steam, electricity and the like normally found in packing plants, and wherein raw materials may be continuously fed into the system thus obviating the usual problem of selecting the raw materials to be used.

A further object of this invention is to provide a high capacity rendering process and apparatus of the class described in which the animal matter is constantly agitated and impinged against heating surfaces in heating chambers by mechanical agitating means and the mechanical agitating means also serve to maintain the heating surfaces of the heating chambers free of material tending to adhere thereto.

These and other objects and advantages of the invention will more fully appear from the following description made in connection with the accompanying drawings, wherein like character references refer to the same or similar parts throughout the several views, and in which:

FIG. 1 is a diagrammatic front elevation view illustrating the novel apparatus for carrying out the process;

FIG. 2 is an end elevational view of the apparatus;

FIG. 3 is a cross sectional view of the conveyor mechanism providing the flow of material into the steam separating devices;

FIG. 4 is a cross sectional view on an enlarged scale of one of the heating chamber structures;

FIG. 5 is a perspective view of one end portion of a heating chamber structure illustrating a volume control gate mechanism; and FIG. 6 is a cross sectional view of the mechanism advantageously utilized to separate the solid and liquid phase material.

Referring now to the drawings and more specifically to FIGS. 1 and 2 it will be seen that one embodiment of the apparatus, designated generally by the reference numeral 10, is diagrammatically there shown. This apparatus 10 includes an accumulating tank 11 which, as shown, is provided with a funnel shaped lower portion 12. It is first pointed out that this apparatus 10 and the process to be described hereinbelow is especially suited for both edible and inedible rendering operations wherein the liquid phase of fats is separated from animal matter. It is further pointed out that the apparatus and process contemplated herein involves a dry rendering operation and wherein animal matter is heated in unpressurized heating chambers.

In a rendering operation, the processed materials include bone, fatty tissue, viscera components, offal and complete body use of dead animals including fish, poultry, hogs and cattle. These raw materials may be continuously fed into the apparatus thus avoiding the usual problem of selection of the raw materials. It will therefore be seen that the process contemplating the specific selection of raw materials is recognized as a costly operation and the instant process and apparatus presents a desirable feature of permitting continuous feeding of the raw materials as the raw materials become available and also minimizes the requirements for handling the raw materials. In the embodiment shown, the raw materials are first fed into a comminuting or hasher device 13 which reduces the larger materials to pieces approximating one-half inch in size. The materials are also washed in the comminuting device and are then fed from the comminuting or hasher device 13 into the accumulating tank 11 where the materials are thoroughly admixed and preheated. It will be seen that the material is conveyed from the hasher or comminuting device 13 by suitable conveyor means 14 to the accumulating tank 11 wherein the animal matter is preheated. This preheating to the desired range of 140° F. to 180° F. speeds up the rendering operation in the heating chambers in a manner to be described hereinbelow.

In addition to the heating means, the accumulating tank 11 is also provided with an agitating mechanism 15 diagrammatically illustrated and comprised of a conventional revolvable agitating member connected to a suitable power means for revolving the agitating member, and which serves to uniformly admix the raw materials used. It will be seen that this agitating mechanism 15 is positioned within the funnel portion 12 of the accumulating tank and it is pointed out that power means in the form of an electric motor will be connected by suitable drive connections to the agitating member.

It will also be seen that the funnel shaped portion 12 of the accumulating tank 11 is provided with a suitable discharge opening which communicates with the interior of an elongate auger conveyor housing 16 in which is disposed an auger conveyor 17. It will be noted that the flights of the auger blade are oppositely directed from the center thereof whereby the auger 17 discharges axially in both directions. The ends of the auger housing 16 communicates with auger mechanisms 18 each of which communicates with a hopper 19. It will be seen that each of the hoppers 19 is provided with an auger mechanism 20 extending therethrough including an auger housing and a suitable auger within the housing driven by suitable drive means whereby the animal matter in each hopper 19 is fed through a discharge outlet at opposite ends of the lower portion thereof. It is pointed out that the auger of the auger mechanism 20 has oppositely directed flights to permit the conveyance of the material received from the hopper member 19 in opposite directions. Opposite ends of the auger mechanism 20 communicate with a vertical conduit which is connected in communicating relation with a cooking or heating device 22 so that two pairs or four such heating devices are provided and each of which is of substantially identical construction.

It will be seen that the heating devices 22 comprise a plurality of vertically arranged heating chamber structures each being of similar construction. It will also be seen that in the embodiment shown, each heating device 22 is comprised of five such heating chamber structures designated by the reference numerals 23a, 23b, 23c, 23d and 23e respectively. These heating chamber structures are of substantially identical construction and each includes an outer cylindrical wall 24 and an inner cylindrical wall 25 spaced from each other and defining a cylindrical volumetric space therebetween which constitutes a steam chamber 26 and which is connected by a suitable conduit means 27 to a source of steam under pressure. Each heating chamber structure is also provided with a suitable valve type vent means 27a to permit bleeding of air from the associated steam chamber 26 to permit uniform heating of the steam chamber.

The interior of each of the heating chamber structures defines a generally cylindrically shaped heating chamber or zone 28 which extends completely through each heating chamber structure. The end portions 29 of each heating chamber or structure is of reduced single wall construction and these end portions are connected to end walls 30 so that each heating chamber structure is closed to the exterior. It will be seen that the adjacent heating chamber structures are connected in communicating relation with each other by interconnecting conduits or ducts 31, the latter communicating with the interior of the reduced end portions 29 of the adjacent heating chamber structures.

It will be noted also that the interconnecting conduits are staggered so that one conduit 31 receives the material discharged from one heating chamber structure at one end thereof and serves to introduce this discharged material into the adjacent end of the next adjacent heating chamber structure. The uppermost of the conduits 31 intercommunicates the heating chamber 28 with the hopper 19 so that the animal matter is continuously introduced into the heating chamber structure through the uppermost conduit 31. Thus, it will be seen that the animal matter is introduced into the heating chamber structure 23a at one end thereof and is discharged at the opposite end thereof while the material discharged from the heating chamber structure 23a is introduced in the heating chamber structure 23b to be conveyed or moved axially therethrough. Thus it will be seen that the animal matter is moved through the heating device 22 in a tortuous course.

It is also pointed out that vent means are provided for each heating chamber structure to permit passage of vaporized moisture to escape to the exterior. It will be appreciated that the animal matter will include a predetermined amount of free water and it is desirable to volatilize or vaporize this free water and remove the same during the rendering operation. Each heating chamber structure is provided with a pair of vent tubes or members 27b which intercommunicate the heating chamber 28 with the exterior as best seen in FIGURE 4, and thus the vaporized moisture may readily escape from the heating chambers to the atmosphere or to a condenser to reduce the pressure in the chamber and remove objectionable odors from the atmosphere as the animal matter is moved axially through the heating chambers.

Means are provided for agitating the animal matter to be rendered as this animal matter is moving through the heating chamber structures and this agitating means also serves to move the animal matter into intimate contact with the inner surface of the inner cylindrical wall 25 of each heating chamber structure. By bringing the animal matter into intimate contacting relation with the inner surface of each heating chamber structure, the separation of the liquid fats from the animal matter may be more rapidly and uniformly accomplished. This agitating mechanism for each heating chamber structure and designated generally by the reference numeral 32 includes an elongate shaft 33 extending through the associated heating chamber structure and having its opposite ends projecting through the associated end walls and journaled in suitable bearings 34.

The shaft 33 is provided with a plurality of paddle elements 32a affixed thereto and projecting radially therefrom, as best seen in FIG. 3. These paddle elements 32a are arranged in staggered relation around the shaft 33 and serve primarily as pointed out above, to move the material into contacting relation with the inner surface of the heating chamber structures. It is pointed out that each paddle element 32a is disposed in a plane arranged substantially radially with respect to the general longitudinal axial center of the shaft 33. By maintaining constant agitation of the material while in the respective heating chamber structures, the downward action of the accumulating material or animal matter overflows from each heating chamber structure into the next adjacent heating chamber structure.

It will be seen that one end of the shaft 33 of each agitating mechanism 32 projects axially beyond one of the end walls 30 and is provided with a sprocket 35 which is suitably keyed thereto for rotation therewith. An endless drive chain 36 engages the sprockets 35 for each of the agitating mechanisms 32 and it will be seen that the endless drive chain 36 is continuously arranged with respect to the sprockets 35, as best seen in FIG. 2, so that the agitating mechanisms in adjacent heating chamber structures are oppositely revolved. Thus the agitating mechanism in heating chamber structure 23a will be revolved in an opposite direction to the agitating mechanism in the heating chamber structure 23b. The endless chain 36 is trained around idler pulleys 37, one of the idler pulleys 37 being connected to a large driven pulley 38 for rotation therewith. The driven pulley 38 is connected by an endless chain 39 to a drive pulley 40, the latter being connected to the output shaft of a suitable drive means such as an electric motor to supply the motive power, for the agitating mechanisms of the heating device 22.

As the material is introduced into the heating device 22 the processed material will have been preheated to a temperature of 140° to 180° F. The inner surfaces of the heating chamber structures 23a and 23b will have a temperature approximating 210° F., thus permitting any free water in the animal matter to vaporize within the heating chamber or zone 28 without the necessity of introducing or providing a pressure condition. To this end, it will be pointed out that this is a dry rendering operation and as pointed out above does not require pressure conditions to exist within the heating chamber structures. The temperature of the inner surface of the heating chamber structure 23c is between approximately 220° and 230° F. and it is pointed out that a certain amount of moisture or free water in the animal matter will have been vaporized as the animal matter is moved through the heating chamber structures 23a and 23b. Thus as the amount of free water in the animal matter decreases, the temperature can accordingly increase without the requirement of pressure. The inner surface of the heating chamber structure 23d is approximately 260° F. while the inner surface of the heating chamber structure 23e is between 270° and 285° F. and preferably between 275° and 280° F. It will therefore be seen that the heating zones presented by the heating device 22 include a range of temperatures from approximately 210° to approximately 280° F. It has been found that by passing the animal matter to be rendered sequentially through heating zones of increasing temperature, the entire rendering process may be very quickly accomplished without the necessity of a pressure condition. Further the free water is removed from the animal matter and the fat will have melted and ruptured the fat cells in which it is contained when subjected to this temperature so that effective rendering is accomplished.

The time required to pass an increment or mass of predetermined size of the animal matter through the heating device 22 falls generally within the range of eighteen to thirty minutes depending on the particular kind of material being rendered. For example, if the material is comprised primarily of fatty tissue in an edible rendering process, the time required would be approximately eighteen minutes. But if the material is comprised essentially of bones, then a longer time, approximately thirty minutes, will be required to effect the rendering or separation of the liquid fats from the solid phase. It will be seen, however, that the entire operation is continuous, thus distinguishing from the interrupted or batch type of operation.

It will be seen that the paddle elements 32a have their outermost ends disposed in close proximity to the inner surface of the inner wall 25. With this arrangement, the paddles not only tend to agitate the material but perform a cleaning action with respect to the inner heating surface of the inner wall 25 and prevent the accumulation of animal matter along this inner surface which would interfere with the heating action.

Means are also provided for maintaining a predetermined level of material within each heating tube, the amount and level of material being determined in accordance with the particular character of the product being rendered. It will be seen that the particular character of the material being rendered will primarily be determined by the ingredients comprising the animal matter so that if the rendering operation is directed to the removal of fats from an animal matter comprised primarily of bones, then the character of the material including its viscosity would be substantially different from that wherein the animal matter was comprised primarily of fatty issue.

The means for controlling the level of material within each heating chamber structure comprises a substantially flat gate 41 which, as best seen in FIGS. 3 and 5, is swingable into and out of obstructing relation with respect to approximately the bottom half portion of the reduced end 29 for each heating chamber structure. It will be noted that the reduced end portions 29 for each heating chamber structure is of generally rectangular configuration and that the gate 41 for each heating chamber structure is pivotally connected thereto by a pivot shaft 42a to which is connected an actuating handle 42. This gate 41 can be swung from a substantially vertical obstructing relation as illustrated in full lines in FIGS. 3 and 5 to a substantially flat unobstructing relation as indicated by dotted line construction.

The gate 41, as seen, is of substantially flat rectangular construction and is preferably constructed of a suitable rigid material such as stainless steel or the like. It will also be noted that the gate 41 when in the horizontal unobstructing position does not in any way obstruct the associated conduit 31 so that material can freely flow from each heating chamber structure, to the adjacent conduit 31.

It will be seen that when the gate is in the vertical position, material passing through the associated heating chamber structure will tend to accumulate in this heating chamber structure because of the damming action of the gate. It is also pointed out that the gate 41 can be retained in any adjusted position between the horizontal and the vertical so that the amount and speed at which the material is passed through each heating chamber structure may be readily varied. Thus material in one heating chamber structure may be passed therethrough at a slower rate than in other of the heating chamber structures. Further, when the gate is in the horizontal position, liquid material may flow unobstructed through each succeeding heating chamber thus permitting these heating chambers to be subjected to a cleaning action. Thus it will be seen that the gate 41 for each heating chamber structure not only facilitates cleaning of each associated heating chamber structure but also permits regulation of the flow and level of the material in each of the heating chamber structures.

After the materials have passed through the lowermost heating chamber structure 23e, all of the fat will have been melted and the fatty tissue cells will have been ruptured so that the liquid fat will have escaped from the tissue material. This mixture of the liquid fat and solid materials will then pass through the lowermost conduit 31 into a hopper or funnel-like structure 43 and thereafter into an auger conveyor housing 44, as best seen in FIGS. 1 and 2. This auger housing has an auger or screw member 45 mounted for rotation therein and which is connected by suitable drive means to a power source whereby the auger 45 is continuously revolved during the rendering operation. It is also pointed out, as best seen in FIG. 2, that the auger 45 has oppositely directed flights so that material introduced into opposite end portions of the auger housing 44 will be conveyed axially towards the center of the auger and discharged through a discharge spout 46.

The liquid fat and solid materials will be received from the spout 46 into a receiving vessel structure 47, two such receiving vessel structures provided for the embodiment shown and each accommodating or receiving material from a pair of the heating devices 22. Referring now to FIG. 6 it will be seen that the receiving vessel structure 47 is of elongate generally V-shaped construction and is comprised of an inner collection member 48 and an outer collection member 49. The inner collection member 49 is of V-shaped construction, the opposite walls 50 thereof converging downwardly and terminating in a trough 51. It is pointed out that the walls 50 and the trough 51 of the inner collection member 49 are of perforate construction to permit the passage of liquid fats therethrough. The outer collection member 48 is constructed of an imperforate material and the walls 52 thereof converging downwardly and defining an elongate, generally U-shaped trough portion 53.

It will be seen that when the material is discharged into the receiving vessel structure 47 the solid phase materials will be retained within the inner collection member 48 while the liquid phase or fats will pass through the apertures in the inner collection member and will accumulate in the trough portion 53 of the outer collection member. The fat thus collected will pass from the trough 53 into a conduit and into a suitable tank structure wherein the fats are thereafter clarified in a conventional manner. If the collection tank is a setting tank, the fats will be clarified by the settling action. It is pointed out that a centrifuge could be used for the clarification action.

The solid phase materials which accumulate within or upon the inner collection member 49 are also subsequently treated to remove the fats or oils which adhere to the solid materials. It will be seen that these solid phase materials will fall downwardly into the trough 51 and will be conveyed axially from one end thereof by a suitable auger conveyor 54, as best seen in FIG. 5. Means are also provided for causing the solid phase materials to be constantly fed into the trough 51 and to this end it will be seen that an agitator mechanism 55 is provided which is comprised of a shaft 56 having radially extending arms 57 extending outwardly therefrom. It will also be seen that the outermost ends of the arms 57 extend in close proximity during their orbits of rotation to predetermined points along the converging walls 50 of the inner collection member 49. Thus these arms tend to engage and loosen the solid phase animal matter which has accumulated upon the walls 50 so that the solid phase materials will be constantly moved downwardly along the walls 50 by action of gravity and into the trough 51. Thus the agitator mechanism 55 assists in smooth and continuous feeding of the solid phase materials into the trough 51.

The solid phase materials are conveyed axially through the trough 53 and are discharged into the vertical conduit 58 which has its lower end connected in communicating relation to an auger housing 59, the latter having an auger or screw type conveyor 60 revolvably mounted therewithin. The shaft of the auger 60 projects outwardly from one end of the auger housing 59 and has a suitable sprocket 61 keyed thereto, the latter having suitable drive chain connections to a source of power so that the auger 60 is continuously driven during the rendering operation. It will also be seen that the vertical conduit 58 is connected centrally of the auger housing 59, as best seen in FIG. 4. It will also be noted that the auger conveyor 60 has oppositely directed flights which extend from the midpoint of the auger conveyor towards opposite ends thereof so that the material will be conveyed axially outwardly from the center of the auger housing 59.

The material is discharged from the auger housing 59 through suitable vertically arranged conduits 62, each conduit being connected in communicating relation with a French oil mill press, the construction of which is well known in the art. This French oil mill press 63, as pointed out above, is of conventional construction and the solid phase material or crackling are subjected to a pressing action to physically separate the fats or oils from the solids. The solid cracklings are thereafter discharged through a discharge opening 64 and are thereafter collected in a suitable receptacle. The liquid phase or fats expressed from the solids in the French oil mill press 63 are thereafter directed to the settling tank with the fats which are previously collected from the separation process in the receiver vessel stucture 47. The liquid phase materials may be moved to the settling tank or other collection receptacle from the French oil mill press by a suitable pump or any conventional liquid conveying means.

The above described process is not ony capable of permitting separation of edible fats or oils from animal matter but also is adaptable for the separation and collection of inedible fats or oils from bone, fatty material, fatty tissue, viscera components, offal and complete body use of dead animals including fish, poultry, hogs and cattle. The above described process constitutes a dry rendering operation but the apparatus and the general overall process is also capable of processing other components such as blood wherein the blood is dried for fertilizer and the like, and is capable of garbage rendering.

In the above described process, the raw materials are first washed and hashed, especially if large pieces of raw material are used. It will be appreciated that when entire carcasses are to be rendered, or wherein large pieces of bone, tissue, hide or the like are to be processed, it is desirable for the most efficient operation to reduce these materials to uniform size. Therefore the materials are hashed or comminuted to particles no greater than one-half inch in size. These materials might also be simultaneously washed or sequentially in another step and are thereafter directed to the accumulating tank wherein the materials are preheated and continuously agitated to produce a uniform mixture. It has been found that by preheating the materials to a temperature within the range of approximately 165° to 180° F., the subsequent rendering steps may be very quickly and effectively carried out.

The preheated material is continually discharged from the accumulating tank and this stream of animal matter is continuously fed into a first heating chamber structure. This heating chamber structure presents a cylindrical heating surface of predetermined length, the temperature of the heating surface being approximately 210° F. Agitating means are provided for constantly agitating the material as it is moved through the first heating chamber structure and for moving the material continuously into intimate contacting relation with the heating surface of the heating chamber structure. The free water of the animal matter will volatilize as the animal matter is moved through the heating device and it has been found that a substantial amount of the free water will have been volatilized as the material is moved through the first two heating chamber structures. The vaporized moisture produced as the animal matter is passed through the first two heating chamber structures is constantly vented to the exterior so that there will be no problem of condensation of this moisture.

The temperature of the heating surface of the third or next heating chamber structure is between 212° and 230° F. and by gradually increasing the temperature, the dry rendering process may be carried out in the absence of pressure. The temperature of the material passing through each heating chamber structure will be slightly less than the temperature of the heating surface of the associated heating chamber structure. This is especially true with respect to all of the heating chamber structures with the exception of the first heating chamber structure. It has been found that the temperature in the heating chamber structure will be sufficient to provide the cracking effect wherein the cells of the fatty tissue will rupture.

The temperature of the heating surface of the heating chamber structures is also above the boiling point of water so that as the material is moved through the heating chamber structures, the rendering or separation of the solid and liquid phase will be accomplished. The heating surface of the fourth heating chamber structure has a temperature of approximately 260° F. and the temperature of the fifth or last heating chamber structure is between 270° and 280° F. Thus the animal matter will be continuously subjected to increasing heat throughout the rendering process. To this end, the heating surface presented by each heating chamber structure is substantially uniform throughout the respective lengths of each heating chamber structure so that the animal matter is subjected to a predetermined temperature during its travel through each heating chamber structure. The fat will have been liquified and separated from the solid phase as the material is moved through the last or lowermost heating chamber structure. The use of staggered paddles which do not impel in the manner of auger conveyors and the like allow exposure of the material to the heating surfaces in the heating chamber structures a sufficient period of time to accomplish the desired rendering action. The actual rendering of the fat in accordance with the process of this invention requires only a relatively short time. In the event that the animal matter is comprised essentially of fatty tissue, the time required for the rendering operation is approximately eighteen minutes, but a proportionate longer time would be required in the event that the animal matter is comprised of bones and the like.

The liquid phase or fat is thereafter separated from the solid phase and is clarified preferably in a settling tank, centrifuge or the like. In the embodiment disclosed, the settling tank is used to clarify the liquid fat, such settling tank being well known in the art. It has been found that considerable fat adheres to the solid tissues so that it is desirable to subject these solid phase materials to a pressing action to remove or express the fats therefrom. Thus the solid phase materials are directed to a French oil mill press which is of conventional construction and is well known in the art wherein the cracklings are subjected to high pressures to express the liquids therefrom. These liquids are thereafter directed to the settling tank while the cracklings are collected by other means.

The apparatus described hereinabove is capable of processing between ten thousand to twelve thousand pounds of material per hour. The solids contain 6–13% moisture before being subjected to the compressive action of the French oil mill press. The apparatus described hereinabove can also be used in the processing of blood, garbage and is capable of handling animal matter comprised of pork, beef, poultry and fish, and fat therefrom. It is also capable of handling animal matter wherein the animal matter to be treated is comprised essentially of bones.

From the foregoing description it will be seen that we have provided a novel process and apparatus which is adaptable for use in removing fats from solid materials in both an inedible and edible rendering operation.

It will further be seen that the apparatus and process described herein is capable of continuous operation and permits high capacity production while minimizing the handling of materials to be processed and the personnel needed to operate the apparatus.

Thus it will be seen that we have provided a process and apparatus for carrying out a dry rendering operation in a more efficient and economical manner than any heretofore known comparable processe and apparatus.

It will, of course, be understood that various changes may be made in the form, details, arrangement and proportions of the various parts without departing from the scope of our invention.

What is claimed is:

1. A continuous process of rendering fat from animal matter comprising;
   agitating and uniformly mixing a supply of comminuted animal matter including fat containing tissues in an accumulating tank to produce a uniform mixture of the animal matter therein,
   discharging a continuous stream of the animal matter from the accumulating tank and sequentially passing the animal matter through a series of substantially exteriorly closed generally horizontally oriented vertically arranged interconnected heating chambers, each presenting continuously cylindrical heating surfaces each having an inlet and an outlet, the outlet of one chamber spaced apart and intercommunicating with the inlet of an adjacent chamber, the temperature of the heating surfaces of the heating chambers successively increasing from the foremost to the last heating chamber from approximately 210° F. to approximately 280° F., partially obstructing the horizontally flowing stream within each chamber adjacent its outlet so as to retain a predetermined volume of animal matter in each chamber,
   subjecting the animal matter in each chamber to the action of an agitating medium to cause the animal matter to be continuously impinged against the heating surface of each heating chamber to thereby cause liquefaction of the fat and rupturing of the fatty tissue whereby the fat is released from the tissue, while the animal matter is allowed to flow slowly through each chamber and to overflow by action of gravity into the next adjacent chamber primarily in response to the influx of additional animal matter being fed into each chamber,
   passing the mixture of liquid fat and solid material over a perforated surface and thereafter separately collecting the liquid fat and the solid materials.

2. The continuous process as described in claim 1 and the additional steps of subjecting the collected solid material to compression to separate the liquid fat adhering thereto therefrom, and passing said liquid fat expressed from the solid material to the collection tank in which the previously separated liquid is collected.

3. The process of claim 1 wherein said comminuted animal matter is of substantially uniform particle size; and said comminuted animal matter is heated to a temperature between 165° F. and 185° F. while in said accumulating tank.

4. Apparatus for use in rendering fat from animal matter including fat containing tissue, said apparatus comprising;
   a heated supply tank for containing a supply of comminuted animal matter to be rendered, said supply tank having a discharge outlet and having agitator means therein,
   a plurality of elongate generally cylindrical heating chamber structures arranged in vertically spaced apart relation and each defining an exteriorly closed heating chamber therewithin and each heating chamber presenting a heating surface, each chamber structure having an inlet and an outlet,
   means interconnecting the outlet of one chamber structure with the inlet of an adjacent heating chamber structure in communicating relation whereby the animal matter to be rendered during the rendering operation is passed sequentially in a predetermined direction through said heating chamber structures,
   conveyor means extending between and interconnecting said discharge outlet of the supply tank in communicating relation with the forwardmost of the heating chambers and being operable to convey material from said supply tank to said forwardmost heating chamber structure,
   means for heating the heating surface of each heating chamber, the temperature of the heating surfaces of the heating chambers successively increasing from the forwardmost to the rearwardmost heating chamber structure,
   revolvable mechanism within each of said heating chamber structures operable to impinge the animal matter against the heating surface of each heating chamber as the animal matter is caused to be moved through the latter, whereby to cause liquefaction of the fat within the fatty tissues and rupturing of the fatty tissues so that the fat is released from the tissues, each impinging mechanism imparting very little axial force to the stream of animal matter in each chamber whereby the stream of animal matter flows from one chamber to the next by action of gravity primarily in response to the influx of additional animal matter being fed into each chamber,
   and a plurality of gate mechanisms each being shiftably mounted adjacent the discharge end of one of said heating chamber structures and each being shiftable between chamber obstructing and open positions, each gate mechanism when in said chamber obstructing position partially obstructing the interior of the associated heating chamber and retaining a predetermined volume of animal matter in each chamber, and being shiftable out of obstructing relation with the associated heating chamber when in the chamber open position,
   means interconnected with the rearmost of said heating chamber structures and being operable for physically separating the liquid phase fat from the solid phase material.

5. Apparatus for use in rendering fat from animal matter including fat containing tissues, said apparatus comprising;
   a supply tank for containing a supply of comminuted animal matter to be rendered, said supply tank having a discharge outlet,
   a plurality of elongate heating chamber structures arranged in vertically spaced apart relation and each defining an exteriorly closed heating chamber therewithin, each heating chamber presenting a cylindrical heating surface, each chamber structure having an inlet at one end thereof and an outlet at the other end thereof, the outlet of one chamber structure being positioned above the inlet of an adjacent chamber structure, means interconnecting the outlet of one chamber structure and the inlet of an adjacent heating chamber structure in communicating relation whereby the animal matter to be rendered during the rendering operation is passed sequentially in a predetermined direction through said heating chamber structures, conveyor means extending between and interconnecting said discharge outlet of the supply tank in communicating relation with the forwardmost of the heating chambers and being operable to convey animal matter from said supply tank to said forwardmost heating chamber structure, means for heating the heating surface of each heating chamber, the temperature of the heating surfaces of the heating chambers successively increasing from the forwardmost heating chamber wherein the temperature of the heating surface is approximately 210° F. to the heating surface of the rearwardmost heating chamber structure wherein the temperature is between approximately 275° to 280° F., a plurality of agitator means each being positioned within one of said heating chamber structures, each agitator mechanism including an elongate shaft having a plurality of paddle elements thereon extending radially therefrom, each agitator mechanism being operable to impinge the animal matter against the heating surface of each heating chamber but each agitator mechanism imparting very little axial changes to the stream of animal matter in each chamber whereby the stream of animal matter flows from one chamber structure to the next by action of gravity primarily in response to the influx of additional animal matter being fed into the chamber structure to cause liquefaction of the fat within the fatty tissues and cause rupturing of the fatty tissues so that the fat is released from the tissues, and a plurality of gate mechanisms each being shiftably mounted adjacent the discharge end of one of said heating chamber structures and each being shiftable between chamber obstructing and open positions, each gate mechanism when in said chamber obstructing position partially obstructing the interior of the associated heating chamber and retaining a predetermined volume of animal matter in each chamber, and being shiftable out of obstructing relation with the associated heating chamber when in the chamber open position, means interconnected with the rearwardmost of said heating chamber structures and being operable for separating the liquid phase fat from the solid material.

6. Apparatus for use in rendering fat from animal matter including fat containing tissues, said apparatus comprising;

a supply tank for containing a supply of comminuted animal matter to be rendered, said supply tank having a discharge outlet, means for heating the matter within said supply tank to a temperature within approximately 140° to 180° F., a plurality of elongate heating chamber structures arranged in vertically spaced apart relation and each defining an exteriorly closed, generally horizontally oriented cylindrical heating chamber therewithin, each heating chamber presenting a generally cylindrical heating surface, each chamber structure having an inlet at one end thereof and an outlet at the other end thereof, the outlet of one chamber structure being spaced above the inlet of an adjacent chamber structure, means interconnecting the outlet of one chamber structure with the inlet of an adjacent heating chamber structure in communicating relation whereby the animal matter to be rendered during the rendering operation is passed sequentially through said heating chamber structures, conveyor means extending between and interconnecting said discharge outlet of the supply tank in communicating relation with the forwardmost of the heating chamber structures and being operable to convey animal matter from said supply tank to said forwardmost heating chamber structure, means for heating the heating surface of each heating chamber, the temperature of the heating surfaces of the heating chambers successively increasing from the forwardmost to the rearwardmost heating chamber structure, each of said heating chamber structures having an elongate shaft revolvably mounted thereon, said shaft for each heating chamber structure having a plurality of paddle elements therein to impinge the animal matter against the heating surface of each heating chamber, said paddle eliminates imparting very little axial force to the stream of animal matter in each chamber whereby the stream of animal matter flows from one chamber structure to the next by action of gravity primarily in response to the influx of additional animal matter being fed into each chamber structure to cause liquefaction of the fat within the fatty tissues and to cause rupturing of the fatty tissues so that the fat is released from the tissues, and a plurality of gate mechanisms each being shiftably mounted adjacent the discharge end of one of said heating chamber structures and each being shiftable between chamber obstructing and open positions, each gate mechanism when in said chamber obstructing position partially obstructing the interior of the associated heating chamber and retaining a predetermined volume of animal matter in each chamber, and being shiftable out of obstructing relation with the associated heating chamber when in the chamber open position, means interconnected with the rearwardmost of the heating chamber structures and being operable for separating the liquid phase fat from the solid phase material.

References Cited

UNITED STATES PATENTS

| | | | |
|---|---|---|---|
| 2,395,900 | 3/1946 | Mueller | 260—412.6 |
| 3,282,972 | 11/1966 | Merlis | 260—412.6 |

HENRY R. JILES, *Primary Examiner.*